A. R. ANDERSON.
FLYTRAP.
APPLICATION FILED AUG. 2, 1918.
1,342,933. Patented June 8, 1920.
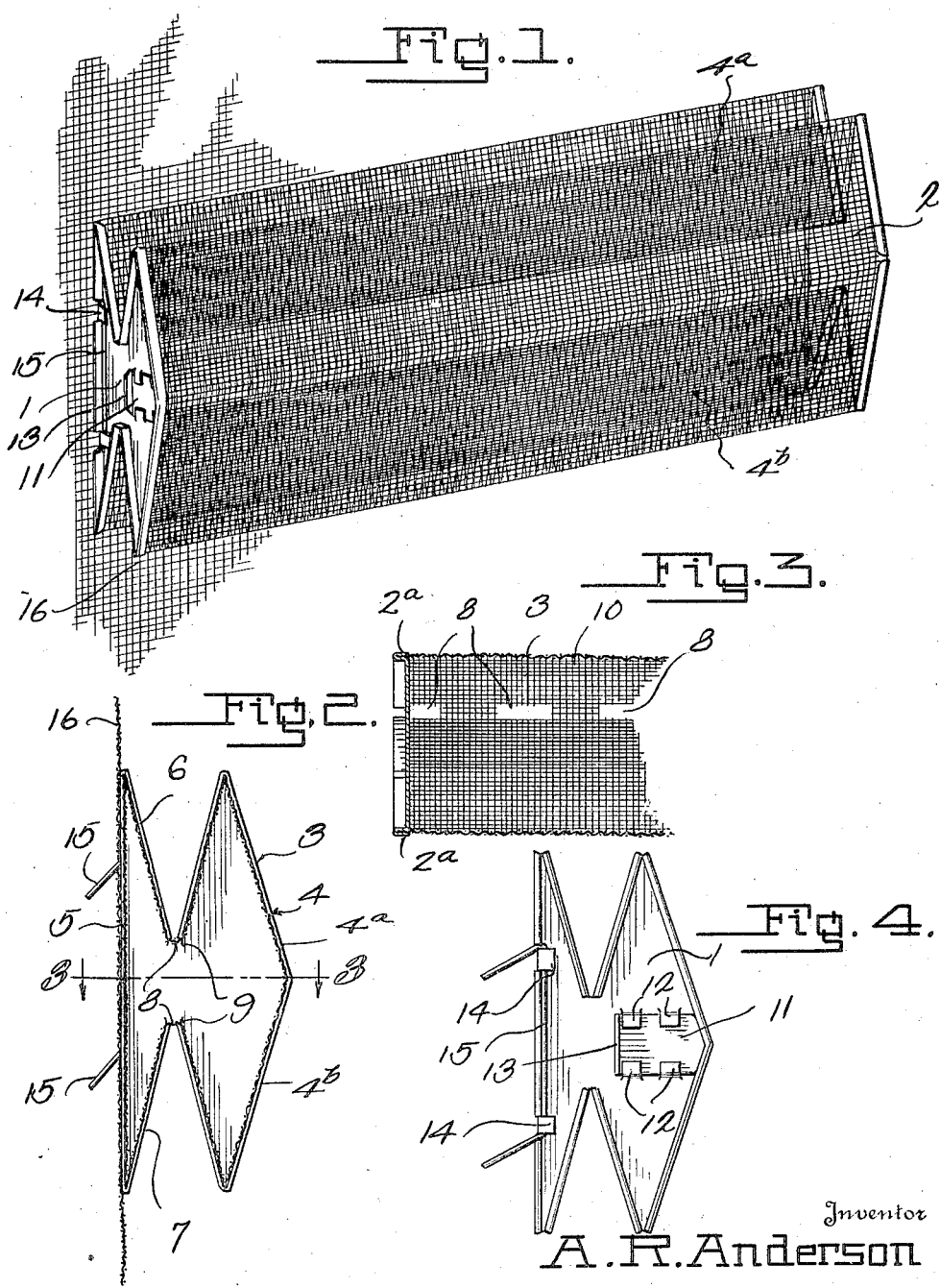

UNITED STATES PATENT OFFICE.

AUGUST R. ANDERSON, OF KINGMAN, ARIZONA, ASSIGNOR OF ONE-HALF TO JAMES HARRY KNIGHT, OF KINGMAN, ARIZONA.

FLYTRAP.

1,342,933.   Specification of Letters Patent.   Patented June 8, 1920.

Application filed August 2, 1918. Serial No. 247,987.

*To all whom it may concern:*

Be it known that I, AUGUST R. ANDERSON, a citizen of the United States, and a resident of Kingman, in the county of Mohave and State of Arizona, have invented certain new and useful Improvements in Flytraps, of which the following is a specification.

This invention relates to improvements in fly traps.

An object of the invention is to improve the construction of fly traps, and to provide a simple, inexpensive and efficient fly trap, adapted to be attached to a screen door, or window screen, and employed for catching flies, for their extermination, in lieu of the ordinary type of adhesive fly paper, poison, or other dangerous or annoying means.

More specifically, the invention comprehends the provision of a fly trap, the main body of which is constructed of screen wire, bent to provide opposed relatively large entrance leadways, which are provided at their innermost points with a plurality of openings to permit the flies to pass into the body of the trap structure and also the provision of end plates, for holding and supporting the screen in body formation which end plates have substantially U-shaped attaching wires pivotally carried thereby for insertion through and attachment to ordinary door or window screens.

Other objects of the invention will appear in the following detailed description, taken in connection with the accompanying drawing, forming a part of this specification, and in which drawing:

Figure 1 is a perspective view of the improved fly trap.

Fig. 2 is a vertical cross section through the fly trap.

Fig. 3 is a fragmentary section on the line 3—3 of Fig. 2.

Fig. 4 is an end view of the fly trap showing the slidable door to permit the emptying of the flies or other insects from the trap.

Referring more particularly to the drawings, 1 and 2 indicate the end plates of the trap, which are constructed of sheet metal, and have their edges bent outwardly, for reinforcement and also bent upon themselves to form substantially U-shaped portions 2ª which engage and securely hold the ends of the body 3 of the trap in their proper positions. The body 3 of the trap is constructed of ordinary screen wire, and has its outer side 4 shaped to form two angular or inclined portions 4ª and 4ᵇ which extend outwardly from the base 5 of the body toward the longitudinal center of the outer side 4 as clearly shown in Fig. 2 of the drawing. The back 5 of the body 3, is also constructed of ordinary screen wire.

The upper and lower sides of the body 3 are inturned, to form leadways, as shown at 6 and 7, the sides of which leadways converge, as they extend inwardly.

The innermost portions of the opposed substantially V-shaped leadways 6 and 7 are provided with a plurality of openings 8 formed therein in spaced relation, to permit the flies to pass into the interior of the body. The openings 8 are formed by punching a suitable instrument through the screen wire, resulting in the cutting of the strands, which cut strands are forced inwardly and form tongues 9, to prevent the flies from passing outwardly through the openings 8. The portions 10 of screen wire between the openings 8, reinforce the leadways 6 and 7.

The end 1, is provided with a suitable opening, to permit of the emptying of the flies or other insects from the body of the trap and this opening is normally closed by a sliding closure plate 11. The closure plate 11 is slidably supported by tongues 12 formed upon the end 1. One end of the sliding closure plate 11 is outturned, as shown at 13 to provide a handle for sliding the plate. The end plates 1 and 2 have tongues 14 cut therefrom and rolled to form bearings for substantially U-shaped attaching wires 15. The wires 15 are adapted to be inserted through the mesh of an ordinary door or window screen as indicated at 16, and to be bent to securely attach the trap to the screen support. The innermost sides of the leadways 6 and 7 lead outwardly and inwardly from the upper and lower longitudinal edges of the back 5 of the body 1, so that a fly or other insect moving either upwardly or downwardly along the surface of the screen 16 would, naturally travel upwardly, or downwardly over either of these sides and pass through one of the openings 8 into the interior of the body, where it would be trapped, and in which it might be killed in any suitable manner. After the flies and insects have been killed, within the body 3 of the trap, the closure 11 is slid into an open position, and the insects emptied from the body.

Changes in details may be made without departing from the spirit of the invention; but

I claim:

1. A fly trap comprising a pair of end plates having substantially V-shaped slits at their upper and lower edges, and a continuous screen wire body fitted at opposite ends to the marginal edge portions of said plates to provide a flat back adapted to be secured against a flat support, and substantially V-shaped lead-ways at opposite sides of the body, the screen wire having certain spaced apart strands severed and bent inwardly in the crotches of said lead-ways for forming means to prevent exit of flies from the body of the trap.

2. A fly trap comprising a pair of end plates having flat inner edges and V-shaped upper and lower edges, a continuous screen mesh body secured at opposite ends to the marginal edges of the plates for forming a flat side to the screen body for attachment against a screen door, and lead-ways at opposite sides of the screen body conforming to the notches in said plates, the said screen body being interrupted in the crotches of said lead-ways for forming apertures through which flies may enter the screen body and prevent the egress of the flies therefrom.

AUGUST R. ANDERSON.